United States Patent
Poisner et al.

(12) 
(10) Patent No.: US 6,269,443 B1
(45) Date of Patent: Jul. 31, 2001

(54) METHOD AND APPARATUS FOR AUTOMATICALLY SELECTING CPU CLOCK FREQUENCY MULTIPLIER

(75) Inventors: David I. Poisner, Folsom, CA (US); Kuljit S. Bains, DuPont, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/222,067

(22) Filed: Dec. 29, 1998

(51) Int. Cl.$^7$ ............................................. G06F 1/24
(52) U.S. Cl. ........................ 713/1; 713/501; 714/23
(58) Field of Search ................................ 713/1, 2, 100, 713/500, 501; 714/2, 3, 23

(56) References Cited

U.S. PATENT DOCUMENTS

| | | | |
|---|---|---|---|
| 5,371,417 | * 12/1994 | Mirov et al. | 327/115 |
| 5,852,728 | * 12/1998 | Matsuda et al. | 713/501 |
| 6,107,846 | * 8/2000 | Shinmori | 327/116 |

* cited by examiner

Primary Examiner—Thomas M. Heckler
(74) Attorney, Agent, or Firm—Isaac Lin

(57) ABSTRACT

An apparatus for automatically selecting a processor clock frequency multiplier is disclosed. The apparatus includes a reset circuit that transmits a reset signal to a processor. When the reset signal is deasserted, the processor samples the states of various strapping signals that are provided by the apparatus. The states of the various strapping signals are determined by a clock frequency multiplier indicator circuit in the apparatus. The apparatus also includes a processor failure detection unit that determines if the processor fails to function properly after reset. If the processor failure detection unit determines that the processor is not functioning properly, the clock frequency multiplier indicator circuit indicates a smaller clock frequency multiplier and a new reset of the processor is performed by asserting the reset signal. The process is repeated until either the processor is determined to be operating properly or the clock frequency multiplier indicator circuit has indicated the smallest possible clock frequency multiplier.

17 Claims, 3 Drawing Sheets

METHOD AND APPARATUS FOR AUTOMATICALLY SELECTING CPU CLOCK FREQUENCY MULTIPLIER

FIELD OF THE INVENTION

The present invention pertains to the field of computer systems. More particularly, this invention pertains to the field of selecting a clock frequency multiplier for a CPU.

BACKGROUND OF THE INVENTION

Many widely used microprocessors use an internal clock frequency multiplier to create a high speed clock from a lower speed system clock. For example, a Pentium® Pro processor manufactured by Intel Corporation may receive a 66 MHz clock signal from a system and multiply the system clock by 5 to create a 333 MHz clock. The processor uses the higher frequency clock signal for internal operations.

Some processors, including some processors manufactured by Intel Corporation, sample the states of various signals upon a reset of the processor to determine which multiple to use to create the internal clock. For example, a processor may have the option of multiplying the system clock by 5, or by 4, or by 3, etc. The state of various signals at reset determine which multiplier the processor will use to generate its internal clock. If the multiplier is set to create an internal clock that runs at a rate greater than that supported by the processor, the processor will fail to function properly.

FIG. 1 shows a typical prior computer system that implements a jumper scheme for selecting a clock frequency multiplier. The computer system 100 includes a processor 110, which for this example is a Pentium® Pro processor, a system memory controller 120, a system memory device 140, a graphics device 130, and a system logic device 150. The system logic device 150 asserts a reset signal 101 to the processor upon initial power up or upon any other reset event. When the reset signal transitions from asserted to deasserted, the processor 110 samples the state of a non-maskable interrupt (NMI/STRAP) signal 102, an interrupt (INTR/STRAP) signal 103, an ignore numerical error (IGNE/STRAP) signal 104, and an A20 mask (A20M/STRAP) signal 105. The signals 102 through 105 are delivered to the processor by a multiplexor (MUX) 160. The MUX 160 selects between the A and B inputs depending on the state of the reset signal 101 which is delivered to the MUX 160 through a reset signal delay circuit 165. The reset circuit is typically delayed from 2 to 20 system clock periods. When the reset signal is asserted (and for a short time thereafter due to the reset delay circuit 165), the MUX delivers the values input on its B inputs to the processor. When the reset signal is deasserted, the processor receives an A20M signal 155, an IGNE signal 154, and INTR signal 153, and an NMI signal 152 by way of the A inputs on the MUX 160.

The values presented to the B inputs of the MUX are determined by physically placing a jumper between each B input and either a logically high voltage level or a logically low voltage level. The configuration of jumpers determines the state of the signals 102 through 105 and thus the frequency multiplier used by the processor to generate its internal clock. It is also common for computer system manufacturers to use a non-volatile memory device in the place of the jumpers.

The jumper solution has a disadvantage in that if the jumpers are incorrectly configured, the processor will either fail or run too slowly. The only way to correct the problem is for a human being to change the jumper configuration. The non-volatile memory solution has the disadvantage of adding the cost of the non-volatile memory device to the cost of the system. With the non-volatile solution, if the processor fails to function correctly with the current strapping settings, the non-volatile memory must be reprogrammed. Both the jumper solution and the non-volatile memory solution incur the cost of the MUX.

SUMMARY OF THE INVENTION

A method and apparatus for automatically selecting a CPU clock frequency multiplier is disclosed. The apparatus includes a processor failure detection unit to detect that a processor has failed to operate properly following a system reset. The apparatus also includes a clock frequency multiplier indicator circuit to indicate which clock frequency multiplier strapping is to be provided to the processor. The clock frequency multiplier indicator circuit indicates a different strapping if the processor failure detection unit detects that the processor failed to operate properly following a system reset.

Other features and advantages of the present invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment of an apparatus for automatically selecting a processor clock frequency multiplier is disclosed. The apparatus includes a reset circuit that transmits a reset signal to a processor. When the reset signal is deasserted, the processor samples the states of various strapping signals that are provided by the apparatus. The states of the various strapping signals are determined by a clock frequency multiplier indicator circuit in the apparatus. The apparatus also includes a processor failure detection unit that determines if the processor fails to function properly after reset. If the processor failure detection unit determines that the processor is not functioning properly, the clock frequency multiplier indicator circuit indicates a smaller clock frequency multiplier and a new reset of the processor is performed by asserting the reset signal. The process is repeated until either the processor is determined to be operating properly or the clock frequency multiplier indicator circuit has indicated the smallest possible clock frequency multiplier. The embodiment has an intended advantage of providing a device for selecting a clock frequency multiplier without the need of human intervention. An additional intended advantage of the embodiment is to provide a cost savings over prior systems.

Figure 1:
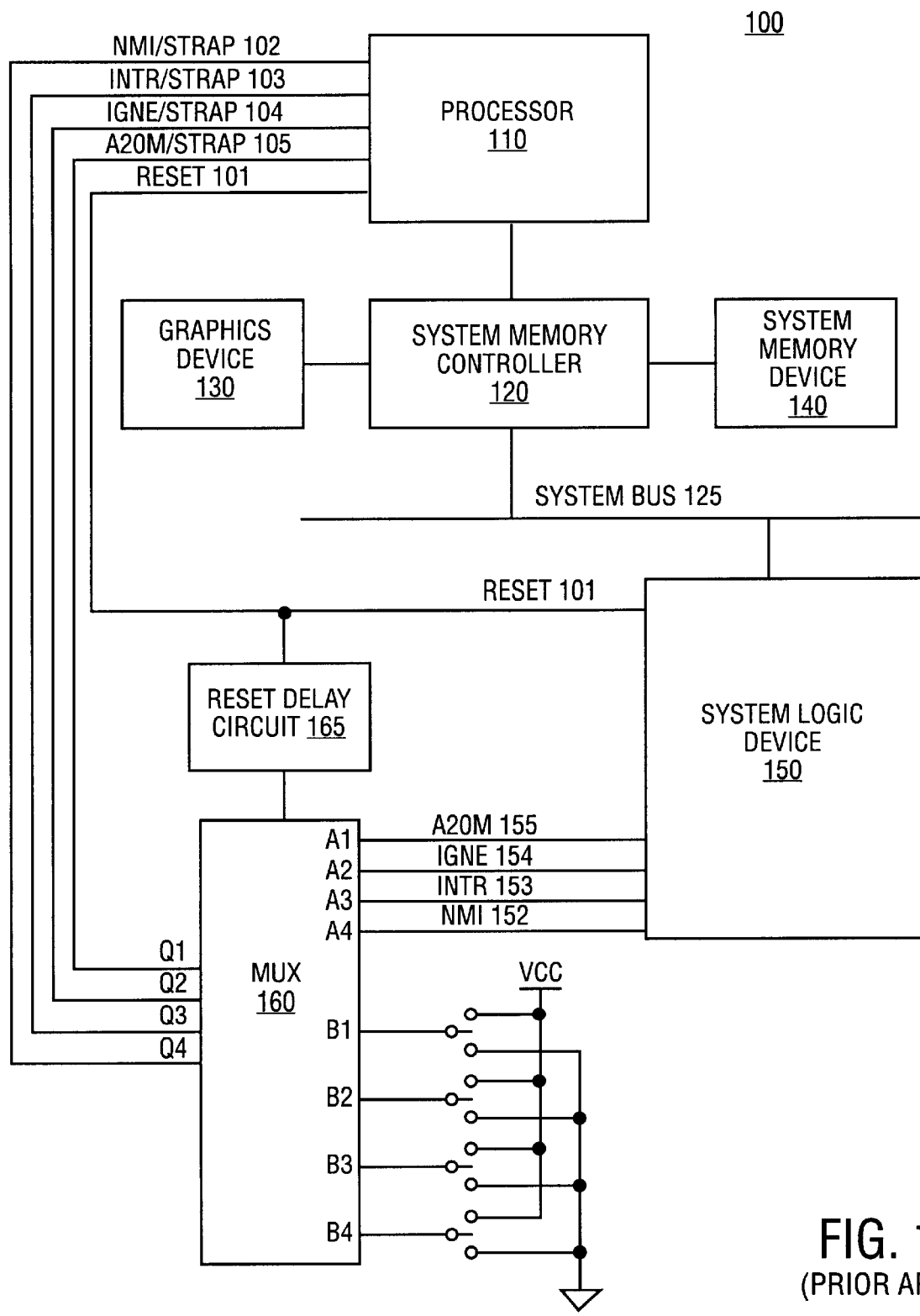
FIG. 1 shows a prior art computer system that utilizes a jumper scheme for selecting a clock frequency multiplier.
Figure 2:
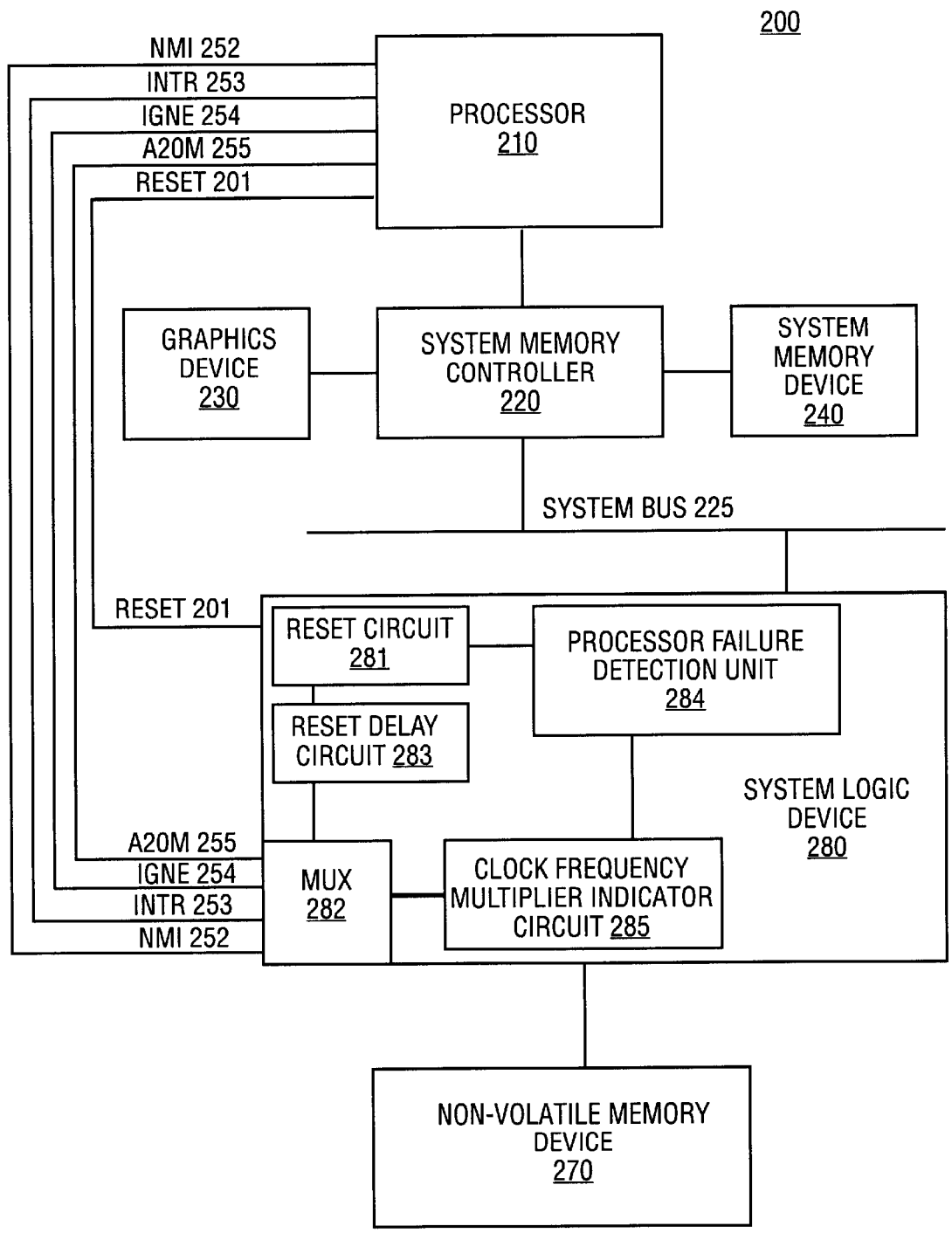
FIG. 2 is a block diagram of a system including one embodiment of a system logic device that includes a processor failure detection unit and a clock frequency multiplier indicator circuit.

FIG. 2 is a block diagram of a system 200 including one embodiment of a system logic device 280 that includes a processor failure detection unit 284 and a clock frequency multiplier indicator circuit 285. The system 200 also includes a processor 210, which for this example embodiment is a Pentium® Pro processor. Other embodiments that incorporate other processor types are possible. The system 200 further includes a system memory device 240, a graphics device 230, and a non-volatile memory device 270. The non-volatile memory device 270 contains a basic input/output service (BIOS) software routine that the processor 210 must access after a system reset.

The system logic device 280 includes a reset circuit 281, a reset delay circuit 283, a MUX 282, a processor failure detection unit 284, and a clock frequency multiplier indicator circuit 285. The system logic device 280 outputs an NMI signal 252 to the processor 210, along with an INTR signal 253, an IGNE signal 254, an A20M signal 255, and a reset signal 201.

The processor failure detection unit 284 preferably checks to see whether the processor performs a first instruction fetch that addresses the non-volatile memory device 270. The processor failure detection unit 284 may also be implemented with a timer to detect whether the processor 210 is functioning. If the processor 210 fails to reset the timer before the timer expires, a failure is detected. Other embodiments that utilize other techniques for determining whether the processor is functioning properly are possible.

The clock frequency multiplier indicator circuit 285 is preferably implemented as an SRAM register. If the system logic device 280 includes a real time clock (RTC), the register can be included in the RTC memory. Preferably, the RTC memory has battery power applied to it when the system is not powered up. Another embodiment is possible where the clock frequency multiplier indicator circuit 285 is implemented as a storage location in a non-volatile memory device such as the device 270 or a separate device such as a flash EEPROM. If the clock frequency multiplier indicator circuit 285 is implemented as part of the RTC memory, the clock frequency multiplier circuit 285 is preferably loaded with a default fail safe value when there is any interruption in RTC power. The fail safe value should indicate the smallest possible clock frequency multiplier.

Upon initial power-up or upon any other reset event, the reset circuit 281 asserts the reset signal 201 to the processor 210. The reset signal is also delivered to the MUX 282 through the reset delay circuit 283. While the reset signal 201 is asserted, the MUX 282 delivers the values indicated by the clock frequency multiplier indicator circuit 285 onto the signals 252 through 255. When the reset circuit 281 deasserts the reset signal, the processor 210 will sample the states of the signals 252 through 255. The reset delay circuit 283 maintains an asserted reset signal to the MUX 282 for a period of preferably between 2 and 20 system clock periods. The 2 to 20 clock period of time that the delayed reset signal remains asserted after the deassertion of the reset signal 201 allows the processor 210 time to sample the states of the signals 252 through 255. When the delayed reset signal becomes deasserted, the MUX 282 then ceases to pass along the values indicated by the clock frequency multiplier indicator circuit 285 and allows the system logic device 280 to operate the signals 252 through 255 in a conventional manner.

After the reset signal 201 becomes deasserted, the processor failure detection unit 284 makes a determination of whether the processor 210 is behaving properly. The determination is accomplished according to the techniques mentioned above. If the processor failure detection unit 284 determines that the processor 210 is working properly, normal system function is maintained. If a failure is detected, the clock frequency multiplier indicator circuit 285 then indicates a smaller clock frequency multiplier, the reset signal 201 is asserted anew, and the process repeats. The process repeats until either no processor failure is detected or the smallest possible clock frequency multiplier has been tried.

Other embodiments are possible, including an embodiment where the processor 210 is able to adjust the value of the frequency multiplier indicator circuit 285. Further, the clock frequency multiplier indicator circuit 285 may be implemented as a circuit that automatically tries different strappings until an optimal clock frequency multiplier is determined. Such a circuit may start with the fastest possible clock frequency multiplier and proceed to try successively smaller multipliers until one is found that allows proper processor operation. Alternatively, such a circuit could implement a binary search of the possible strappings to find an optimal multiplier.

Figure 3:
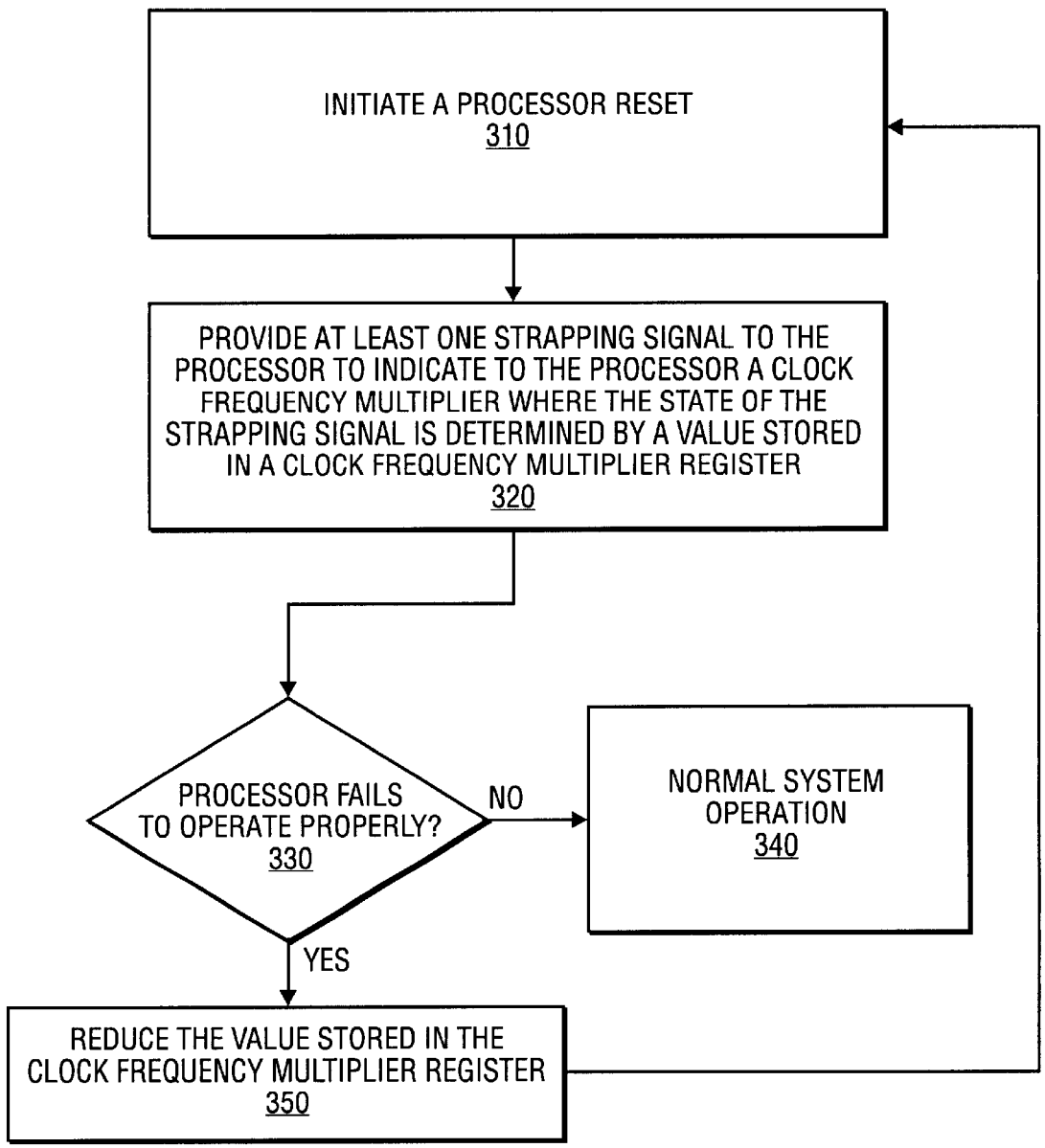
FIG. 3 is one embodiment of a method to automatically select a processor clock frequency multiplier.

FIG. 3 is one embodiment of a method to automatically select a processor clock frequency multiplier. At step 310, a processor reset is initiated. At least one strapping signal is provided to the processor at step 320. The state of the strapping signal is determined by a value stored in a clock frequency multiplier register. If the processor operates properly at step 330, then the system operates in a conventional fashion at step 340. If the processor fails to operate properly at step 330, then the value stored in the clock frequency multiplier register is reduced at step 350 and the method returns to step 310.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a processing failure detection unit for detecting processor operation failure following system reset; and
   a clock frequency multiplier indicator circuit for selecting a clock frequency multiplier value if the processing failure detection unit detects that the processor failed to operate properly following a system reset, wherein the clock frequency multiplier value is used to create an internal clock for the processor.

2. The apparatus of claim 1, the processor failure detection unit to detect that the processor has failed to perform a first instruction fetch.

3. The apparatus of claim 1, further comprising a multiplexer (MUX) to provide at least one strapping signal to the processor.

4. The apparatus of claim 1, the clock frequency multiplier indicator circuit for selecting a clock frequency multiplier value to create a clock with a lesser frequency than the last generated internal clock if the processor failure detection unit detects that the processor failed to operate properly following a system reset.

5. The apparatus of claim 4, further comprising a reset circuit to transmit a reset signal to the processor after the clock frequency multiplier circuit selects a clock frequency multiplier value.

6. The apparatus of claim 5, wherein the clock frequency indicator circuit includes a SRAM register.

7. The apparatus of claim 6, wherein the SRAM register is provided battery backup power.

8. A system, comprising:

a processor; and a system logic device, including a processing failure detection unit for detecting processor operation failure following system reset; and a clock frequency multiplier indicator circuit for selecting a clock frequency multiplier value if the processing failure detection unit detects that the processor failed to operate properly following a system reset, wherein the clock frequency multiplier value is used to create an internal clock for the processor; and a multiplexer (MUX) to provide at least one strapping signal to the processor.

9. The system of claim 8, the processor failure detection unit to detect that the processor has failed to perform a first instruction fetch.

10. The system of claim 8, the clock frequency multiplier indicator circuit for selecting a clock frequency multiplier value to create a clock with a lesser frequency than the last generated internal clock if the processor failure detection unit detects that the processor failed to operate properly following a system reset.

11. The system of claim 10, further comprising a reset circuit to transmit a reset signal to the processor after the clock frequency multiplier circuit selects a clock frequency multiplier value.

12. The system of claim 11, wherein the clock frequency indicator circuit includes a SRAM register.

13. The system of claim 12, wherein the SRAM register is provided battery backup power.

14. A system, comprising:

a processor;

a system logic device, including a processing failure detection unit for detecting processor operation failure following system reset; and a multiplexer (MUX) to provide at least one strapping signal to the processor; and a non-volatile memory device whose contents determine which clock frequency multiplier value is to be provided to the processor, the nonvolatile memory contents to reduce in value if the processor failure detection unit detects that the processor failed to operate properly following a system reset.

15. The system of claim 14, wherein the non-volatile memory device includes a flash EEPROM.

16. A method, comprising:

a) initiating a processor reset;

b) providing at least one strapping signal to the processor to indicate to the processor a clock frequency multiplier, the state of the strapping signal determined by a value stored in a clock frequency multiplier register;

c) determining whether the processor fails to operate properly following the processor reset;

d) reducing the value stored in the clock frequency multiplier register if the processor fails to operate properly following the processor reset; and e) initiating an additional processor reset.

17. The method of claim 16, further comprising:

f) repeating steps b), c), d), and e) until either the processor operates properly or the smallest possible clock frequency multiplier has been tried.

\* \* \* \* \*